United States Patent [19]

Zeuner et al.

[11] 4,276,811
[45] Jul. 7, 1981

[54] CLOSED CENTER PROGRAMMED VALVE SYSTEM WITH LOAD SENSE

[75] Inventors: Kenneth W. Zeuner, New Hope; Alonzo B. Jarman, Wrightstown, both of Pa.

[73] Assignee: Control Concepts, Inc., Newtown, Pa.

[21] Appl. No.: 34,778

[22] Filed: Apr. 30, 1979

Related U.S. Application Data

[63] Continuation-in-part of Ser. No. 842,264, Oct. 14, 1977, Ser. No. 723,023, Sep. 13, 1976, Pat. No. 4,202,250, and Ser. No. 578,006, May 16, 1975, Pat. No. 3,980,002, said Ser. No. 578,006, is a continuation of Ser. No. 304,816, Nov. 8, 1972, abandoned, said Ser. No. 723,023, and Ser. No. 842,264, each is a continuation-in-part of Ser. No. 578,006.

[51] Int. Cl.³ .................. F15B 11/08; F15B 11/20
[52] U.S. Cl. ........................................ 91/449; 60/422; 91/454; 91/459
[58] Field of Search ............... 91/449, 454, 461, 445, 91/459; 60/424, 484, 489, 420, 422, 459, 431, 456, 452, 468; 137/596.12, 596.15, 596.18; 251/50

[56] References Cited

U.S. PATENT DOCUMENTS

| | | | |
|---|---|---|---|
| 3,494,258 | 2/1970 | Harrns | 91/454 |
| 4,116,001 | 9/1978 | Orth | 60/420 |
| 4,174,034 | 4/1979 | Johnson | 60/422 |
| 4,174,614 | 11/1979 | Dezelan | 60/445 |
| 4,194,362 | 3/1980 | Nonnenmacher | 60/431 |
| 4,201,052 | 5/1980 | Breeden | 60/445 |
| 4,202,250 | 5/1980 | Zeuner | 91/449 |

Primary Examiner—Edward J. McCarthy
Attorney, Agent, or Firm—Frailey & Ratner

[57] ABSTRACT

A closed center programmed valve system having a load sense fluid source for control of the raising and lowering of load means by a raise and a lower normally closed two stage valve assembly. Each of the second stages of the valve assemblies has a poppet with a parabolic control which is dimensioned to provide substantially linear flow rate change for minimized shock when the respective valve is actuated to the valve closed state. The load sense for the load means is taken from the outlet of the raise second stage without the requirement of a separate actuated valve or land with a load sense signal being applied to the fluid source during the time the raise valve assembly is actuated to the valve open state.

12 Claims, 10 Drawing Figures

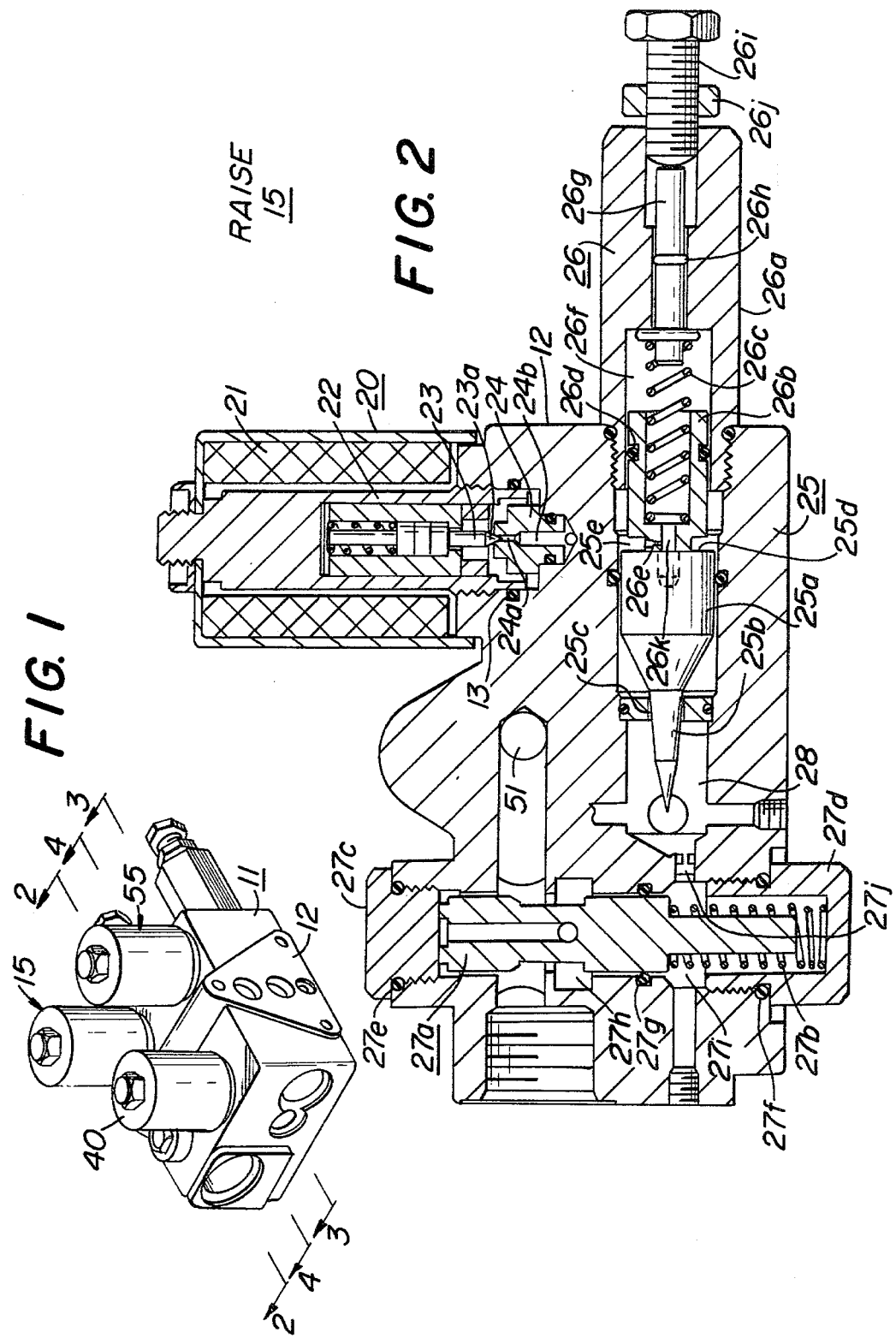

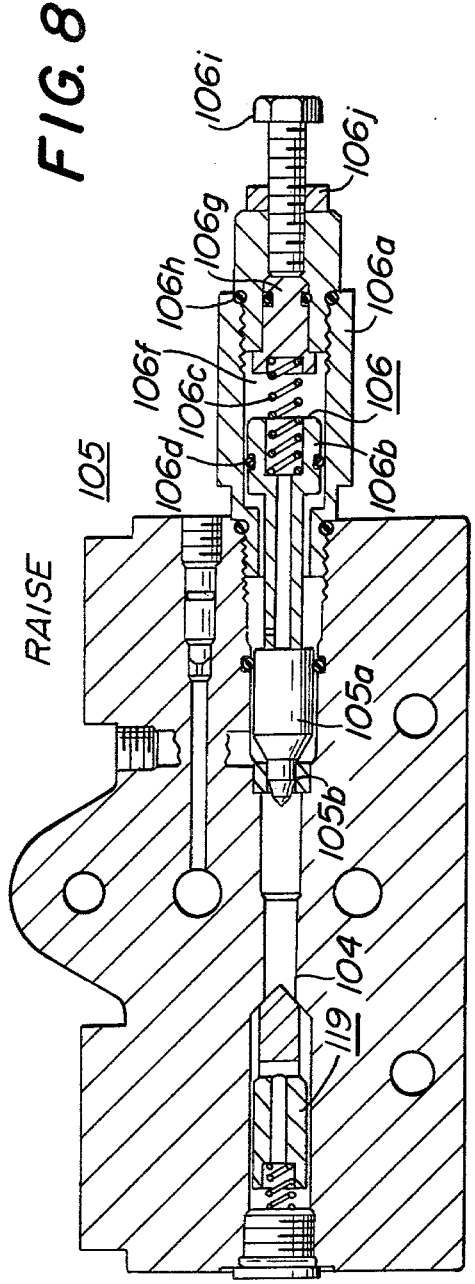
FIG. 8
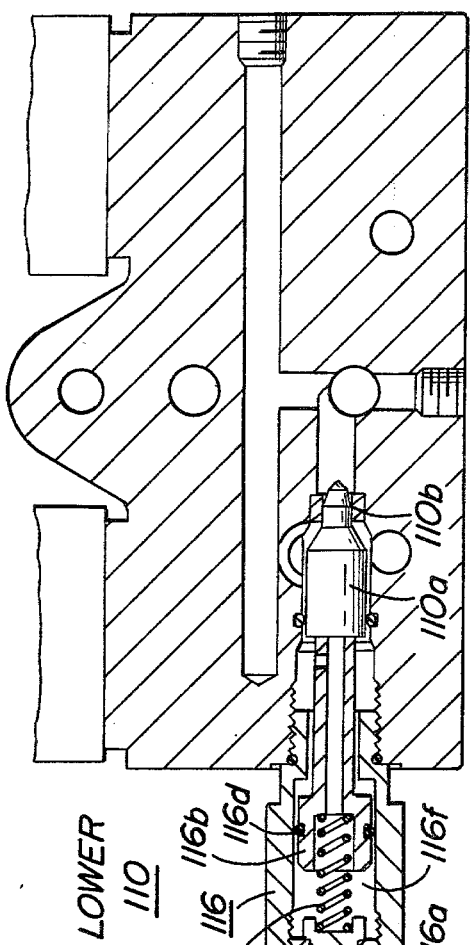
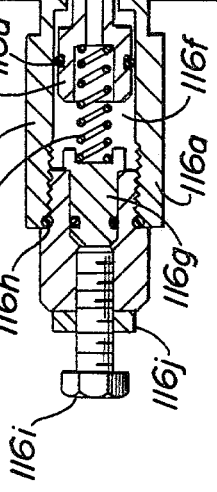
FIG. 9

CLOSED CENTER PROGRAMMED VALVE SYSTEM WITH LOAD SENSE

This is a continuation-in-part of (1) application Ser. No. 578,006, filed May 16, 1975, now U.S. Pat. No. 3,980,002, (2) application Ser. No. 723,023, filed Sept. 13, 1976 now Pat. No. 4,202,250, and (3) application Ser. No. 842,264, filed Oct. 14, 1977.Ser. No. 578,006 is a continuation of Ser. No. 304,816, filed Nov. 8, 1972, abandoned. Ser. Nos. 723,023 and 842,264 are continuations-in-part of Ser. No. 578,006.

BACKGROUND OF THE INVENTION

A. Field of the Invention

This invention relates to the field of art of automatic positioning control systems having solenoid operated valve assemblies.

B. Prior Art

Prior positioning control valve systems have been known which sense load on demand. Such positioning control systems have been particularly important in the contour following mobile equipment field such as, for example, in agricultural combines in which a heavy header is positioned. In this environment, it is important to provide load sensing with minimal complexity as well as fine control of flow to maintain the header within a necessary dead band while minimizing shock load to the header. While the prior art does disclose positioning control valve systems, it left much to be desired in valving complexity since the ability to sense load on demand has in the past been provided by either an extra valve or an extra land on a spool type control valve.

Accordingly an object of the present invention is a programmed valve system in which load sense is sensed without requiring a separate valve actuator or a separate land on a spool.

SUMMARY OF THE INVENTION

A programmed valve system for positioning control of a load from a load sense fluid source having a pair of two stage valve assemblies. A first of the valve assemblies comprises a solenoid operated pilot stage maintained normally closed. A second stage is divided into inlet and outlet sections with the inlet section coupled to the fluid source. A second of the valve assemblies also has a solenoid operated pilot stage maintained normally closed. Both second stage poppets each have an outer substantially parabolic contour to provide a predetermined flow area between the respective orifice and the parabolic contour for minimizing shock. The load is coupled to the outlet sections of the second stages of both assemblies. Means free of a valve actuator couples the load sense line to the outlet section of the first valve assembly. In this manner a load sense signal is applied by way of the load sense line to the fluid source during the time that the first assembly pilot stage is actuated to the valve open state.

BRIEF DESCRIPTION OF THE DRAWINGS

FIG. 1 is a perspective view of a valve system having a pair of two stage valve assemblies of the present invention;

FIG. 2 is a sectional view of the valve system of FIG. 1 taken along lines 2—2;

FIG. 8 is a sectional view of the valve system of FIG. 6 taken along lines 8—8;

FIG. 9 is a sectional view of the valve system of FIG. 6 taken along lines 9—9.

DETAILED DESCRIPTION

Figure 3:
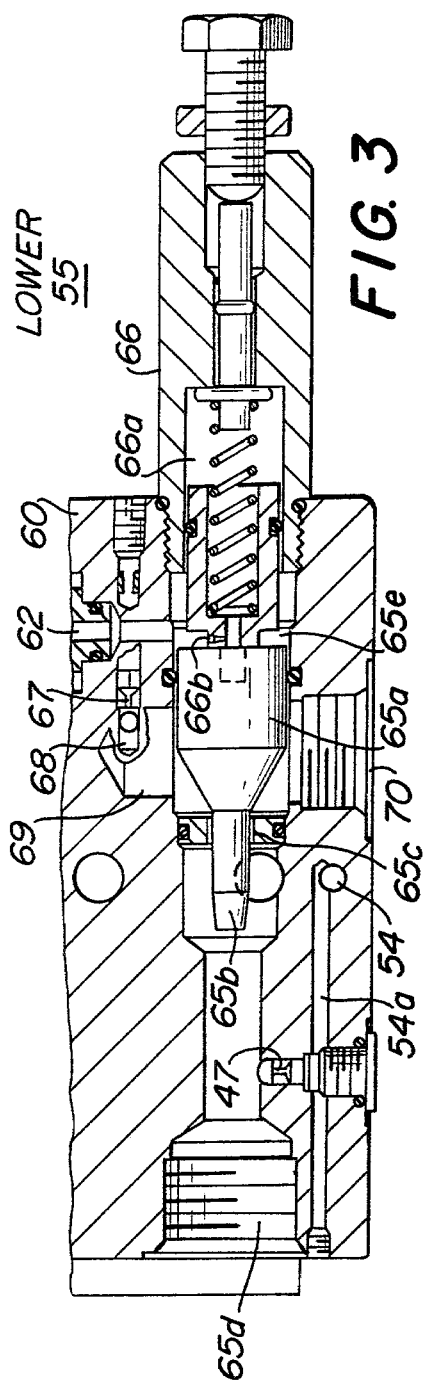
FIG. 3 is a sectional view of the valve system of FIG. 1 taken along lines 3—3.

Referring now to FIGS. 1-5, valve system 11 is a closed center load sensing dual programmed unbalanced load system having a pair of two stage normally closed valve assemblies 15 and 55 with respective dashpots 26 and 66 designed to work in conjunction with a pressure compensated hydraulic pump 80. Load sensing for pump control is provided by means of an integral passage 43 located between raise second stage orifice 25c and raise check valve 49 and communicating directly with the raise pressure supply chamber 28.

System 11 may be used in positioning a header (shown as weight 85, FIG. 5) of an agricultural harvester combine. Control of such positioning has been particularly important in contour following mobile equipment field such as agricultural combines which have very large springy tires. A combine carries a heavy header which may weigh, for example, 2,000 lbs. When the header is hydraulically moved, any shock waves produced are transmitted first to the chassis of the combine and then to the tires, resulting in extremely objectionable oscillations. A further problem in combine operation has been that, after finishing a row, it has been important that the header be rapidly raised and taken out of the row. In the rough terrain of the field, the combine must then be turned, realigned with the row, and then the header rapidly lowered back into the field to begin a new cut. As the new cut is being made, the header must be adjusted at high speeds within fractions of an inch in order to maintain proper cutting height. As well known, a combine has pilot valves such as contour following devices that apply energization signals to pilot valves such as solenoid operated first stage pilot valves 20 and 60 so that the header is constrained to operate within a dead band the limits of which are required to be kept at a minimum, as for example, from one to one and a half inches. Within that narrow dead band, the header must avoid overshoot and undershoot at normal cutting speeds. Thus, a single positioning control hydraulic system must provide rapid raising of a very heavy header load at the end of a row, and, after the cut has been started, the hydraulic system must then accurately and carefully maintain a very narrow dead band at the desired ideal cutting height with minimized overshoot and undershoot.

An important feature in combine operation is the ability of the hydraulic positioning control system to sense load, when desired, in order to permit a conventional single pressure compensated pump 80 to provide the required pressure for raising the load (header) 85 while also supplying hydraulic power simultaneously for other related functions.

In the described valve system, pump pressure is applied in the header raise mode only, during which load feedback pressure sensing is applied to the pump 80 to bring it up to required operating pressure. Header lowering is accomplished by gravity.

In valve system 11 control of fluid flow is by means of solenoid operated first stage pilot valves 20 and 60, used in conjunction with respective second stages 25, 65 having parabolically contoured second stage poppets 25a and 65a and dashpots 26 and 66. Each second stage poppet has an outer smooth imperforate continuous surface with a substantially parabolic contour to provide a predetermined flow area between the respective second stage orifice 25c, 65c and this parabolic contour as the second stage poppet moves within the second stage orifice. The second stage poppets are controlled in closing with substantially linear flow rate change for minimized shock when the pilot stage is closed. In the opening mode, the respective dashpots 26, 66 are effective to restrict the rate of opening of the associated second stage poppet, thereby slowing reaction of the valve in order to further minimize shock during start raise and start lower of the header (load). This is described in more detail herein and in U.S. Pat. No. 3,980,002.

Figure 4:
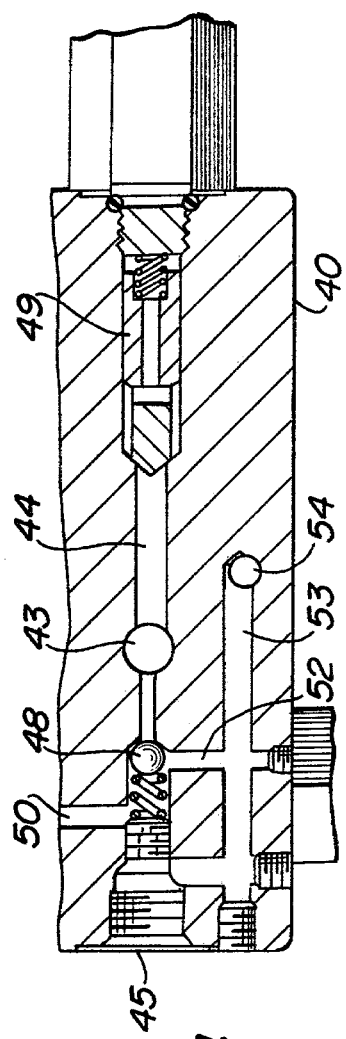
FIG. 4 is a sectional view of the valve system of FIG. 1 taken along lines 4—4.

As shown in FIGS. 1-4, valve system 11 comprises a body 12 housing three separate solenoid operated valve assemblies 15, 40 and 55, shown in FIGS. 2, 3 and 4, and a pressure compensator assembly 27 shown in FIG. 2. The raise valve assembly 15 comprises a normally closed first stage solenoid operated pilot valve assembly 20 described in detail, for example in U.S. Pat. No. 3,737,141. Sleeve 22 of assembly 20 is threaded into the valve body 12 with an O-ring 13 provided to prevent leakage between the sleeve and valve body. Located within sleeve 22 is spring-loaded first stage poppet 23 which seats (in the unenergized condition) in orifice assembly 24 located in valve body 12 immediately below a solenoid assembly 21. An orifice 24a normally closed by poppet end 23a is sized to provide the desired fluid flow characteristics. An axial passage 24b leading downward from the orifice is in fluid communication with second stage chamber 25e of second stage 25. Chamber 25e houses second stage poppet 25a, the contoured nose section 25b of which is sized and shaped to provide desired flow characteristics in conjunction with orifice 25c.

A dashpot assembly 26 located to the right of the poppet 25a comprises a body 26a threaded into valve body 12 and containing a dashpot cylinder 26b biased to the left by spring 26c to contact poppet 25a. An O-ring 26d prevents leakage between the dashpot cylinder 26b and body 26a. An axially displaced orifice 26e, designed to be substantially sensitive to dirt, permits a metered flow of fluid from the inside chamber 26f of the dashpot as it is moved to the right by opening of poppet 25a. Stop 26g equipped with O-ring 26h to prevent leakage from the dashpot chamber, may be adjusted by screw 26i with lock nut 26j to compress spring 26c, thereby increasing the resistance of the dashpot to movement by the poppet 25a and, finally, acting as a stop to restrict movement of the dashpot to the right.

An additional feature is an integral pressure compensator 27 designed to maintain the required pressure drop across the valve in the raised mode, regardless of any other pressure demands created by ancillary hydraulic functions. Pressure compensator assembly 27 shown on the left of FIG. 2 comprises a spool 27a biased in the upward direction by spring 27b. The lower end of the spool communicates by way of a restrictor orifice 27j with chamber 28 of second stage 25. The upper portion of spool 27a is positioned to restrict the flow of pressurized fluid from pump 80 to load 30, as required to maintain the necessary pressure drop across the valve under all conditions of pressure demand. The compensator is disposed within valve body 12 by two end caps 27c and 27d. O-rings 27e and 27f seal the end caps. A further O-ring 27g prevents interflow between upper and lower chambers 27h and 27i of the compensator.

A lateral passage 43 (FIG. 4) conveys pressurized fluid to main raise pressure fluid line 44. A ball check valve 48 at the left hand end of line 44 communicates directly with load sense port 45. A plunger type check valve 49 at the right hand end of line 44 permits pressurized raise fluid to pass through outlet port 51 (FIG. 2). A vertical passage 50 to the left of load sense check valve 48 connects orifice 42 of pump control pilot valve 40 directly to load sense outlet port 45 when solenoid assembly 41 is energized. This permits load sense control of pump 80 (for ancillary functions) independent of the operation of raise valve assembly 15. A vertical passage 52 directly below check valve 48 communicates by way of passages 53, 54 and 54a with restrictor orifice 47, which is open to outlet port to tank 65d.

As shown in FIG. 3, lower solenoid valve assembly 55 is similar in most respects to raise valve assembly 15. All components of first stage poppet valve assembly 60 are indentical except orifice 62, which is again sized to provide desired flow characteristics. A dashpot assembly 66 is identical to raise valve dashpot assembly 26. Fixed restrictor 67 is disposed in a passage 68 connecting cylinder load inlet chamber 69 with chamber 65e which houses poppet 65a. In the normal closed position, the contoured nose section 65b closes orifice 65c leading to an outlet to tank 65d.

Figure 5:
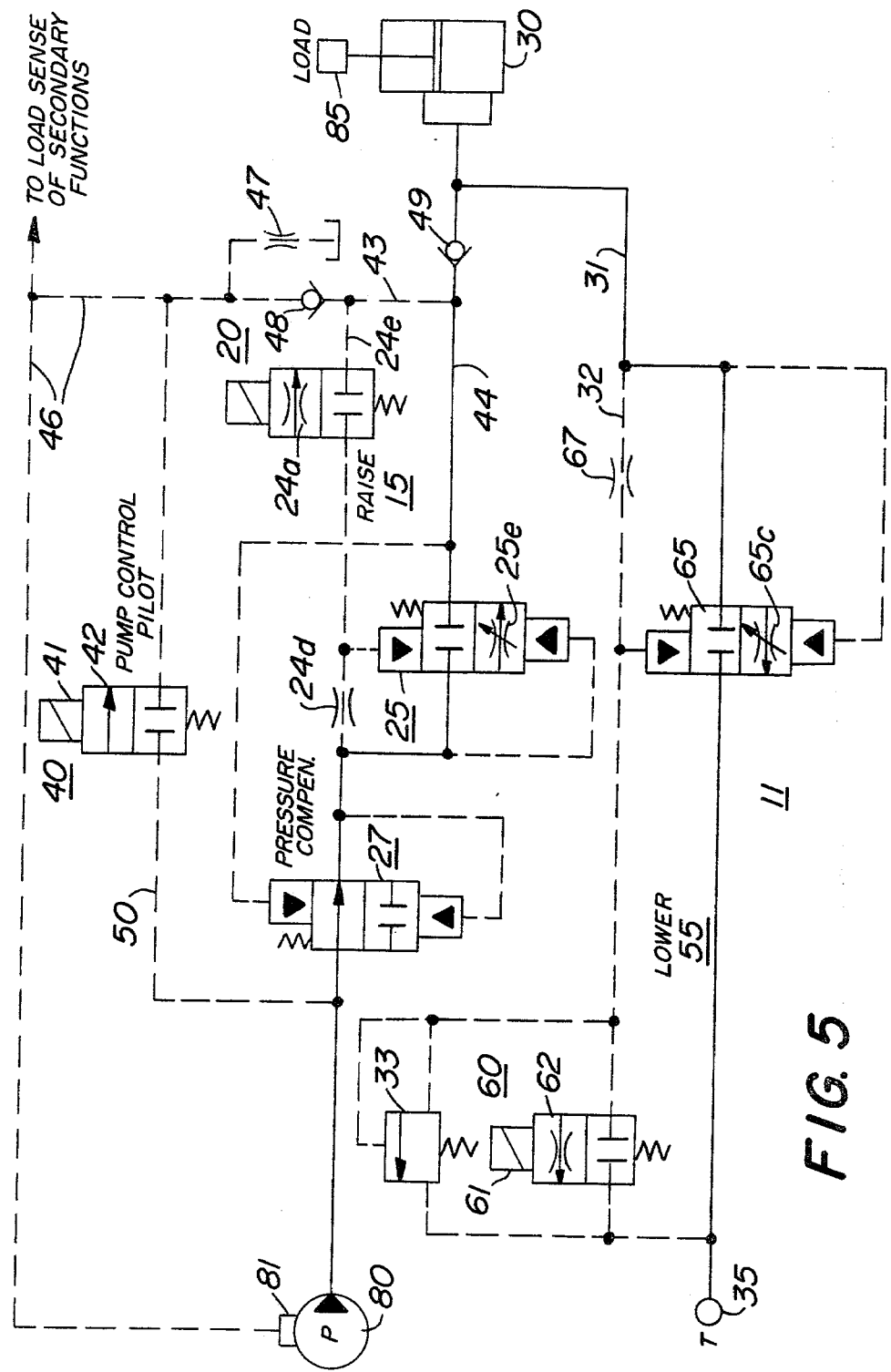
FIG. 5 is a schematic drawing of the valve system of FIG. 1 and further includes an unbalanced load and a load sense pump.
Figure 6:
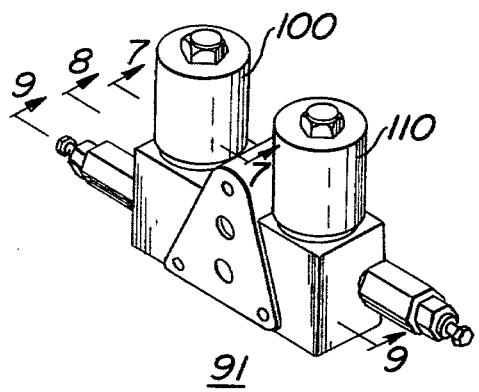
FIG. 6 is a perspective view of another embodiment of the invention comprising a valve system having a pair of two stage valve assemblies.
Figure 7:
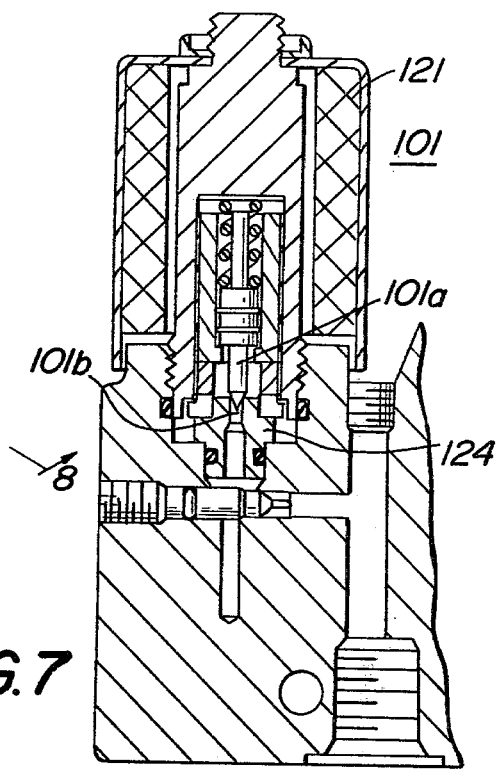
FIG. 7 is a sectional view of the valve system of FIG. 6 taken along lines 7—7.

As best shown in FIG. 5, pump 80 is coupled (1) by way of compensator 27, open second stage raise orifice 25e, line 44, and check valve 49 to the raise side of load cylinder 30, (2) by way of pilot line restrictor 24d and first stage raise orifice 24a to line 24e in communication with both check valve 49 in passage 43 and load sense line 46 and then to pump compensator 81 and also, through restrictor 47, to tank. Additionally, pump 80 may also be coupled to load sense line 46 through solenoid operated pump control pilot valve 40. The lower side of load cylinder 30 is coupled (1) by way of line 31 and open second stage lower orifice 65c to tank 35, (2) by way of pilot line 32, restrictor 67, and first stage lower orifice 62 to tank 35 and also (3) by way of pilot line 32 and pressure relief valve 33 to tank 35.

Accordingly, as shown, first stage raise poppet 23, seated in orifice 24a, controls flow between pilot line 24e coupled to the pump 80 and lines 43 and 44 which are in communication with both load raise check valve 49 and load sense check valve 48. The first stage lower poppet (not shown), seated in orifice 62 controls the flow between pilot line 32, restrictor orifice 67 and tank 35.

Operation is described with respect to FIGS. 1-5 as follows. In the quiescent state, both raise and lower solenoid operated first stage orifices 24a and 62 are closed, and raise and lower second stage orifices 25c and 65c are therefore also closed. In addition, pump control pilot valve 40 is also closed. Pump idle pressure is applied directly to the left hand side of second stage raise poppet 25a and, through a restrictor orifice 24d, to the right hand side. Load pressure is applied directly to the left hand side of lower second stage poppet 65a and through a restrictor orifice 67 to the right hand side.

To initiate the raise sequence, raise pilot solenoid valve 20 is energized, causing raise first stage poppet 23 to open first stage orifice 24a in stop 24. This permits a flow of fluid across restrictor orifice 24d, relieving pump pressure to the right hand side of second stage poppet 25a, thereby permitting pump pressurized fluid, still applied to the left hand side, to move this poppet to the right. This allows fluid from the pump to flow through lateral passage 43 to main raise pressure gallery 44. At this point, oil flow divides, a portion passing through load sense ball check valve 48 to exit from the load sense port 45, thereby becoming effective to pressurize the pump compensator 81, to bring the pump 80 up to required output pressure to raise the load (header) 85. It will now be understood that a load sensing signal is provided each time the raise valve is energized, simply by virtue of the fact that an additional passage for load sensing is located in the valve body downstream from the second stage raise orifice 25c.

The major portion of the oil, now raised to the required raise pressure, flows to the right through poppet check valve 49 and thence to the pressure outlet port 51 on communication with the raise side of load cylinder 30. The rate of opening of poppet 25a is dampened by dashpot assembly 26, which operates in the following manner.

As poppet 25a moves to the right, away from orifice 25c, the right-hand face 25d pushes against the left-hand face of dashpot cylinder 26b. Dashpot cylinder 26b is spring biased by a spring 26c secured at its right-hand end to an adjustable stop 26g. Fluid is released from chamber 26f by way of flow restrictor orifice 26e into chamber 25e. As that fluid is released, poppet 25a is thus restricted in the speed at which it opens or moves to the right away from orifice 25c. Accordingly, dashpot assembly 26 is effective to restrict and dampen the opening of poppet 25a, thereby to dampen the rate of raising of the load 85.

It will be understood that there is no restriction on the closing of poppet 25a, since, as poppet 25a moves to the left, it is free to separate from the dashpot cylinder 26b. When these elements separate, fluid is allowed to freely flow from chamber 25e through unrestricted conduit 26k into chamber 26f. In this manner, spring 26c is effective to reset dashpot assembly 26 for the next open command to raise the load. As shown in FIG. 2, a set screw 26i provides a convenient way to adjust stop 26g and thereby adjust the maximum travel of poppet 25a. This establishes the maximum flow during the raising operation through orifice 25c into line 51. In this way, orifice 25c is effectively adjusted, and such adjustment may be made as the headers are changed. The operator is thus able to adjust the maximum raise velocity of the header to maintain a safe limit.

It will now be understood that the opening of poppet 25a and the resultant raising of the load (header) 85 is dampened by means of the dashpot assembly 26. At the same time, the start raise shock is effectively minimized as a result of the parabolic contour of the nose section 25b of poppet 25a, which provides a substantially linear flow rate change between the section and orifice 25c as described in detail in Ser. No. 723,023 and U.S. Pat. No. 3,980,002. When poppet 25a reaches its fully open position, header 85 continues to raise until poppet 23 is deenergized. At that time, poppet 23 returns to its normally closed state and poppet 25a, unrestricted by dashpot assembly 26, rapidly closes to minimize overshoot of the header. In this rapid closing, the actual stop raise shock has been found in this embodiment to have decreased adverse effect on the system as compared with the important requirement of minimum header overshoot beyond the desired point. In any event, with fluid flow between the parabolic contour 25b and the orifice 25c, there is improvement in the deceleration or stop raise shock.

To bring the pump 80 up to pressure without activating the raise cylinder valve 20, pump control pilot valve solenoid 41 is energized. When this happens, orifice 42 is opened, permitting fluid from the pump at idle pressure to pass ito vertical passage 50 and through a orifice 42 to the load sense port 45, thereby pressurizing the pump compensator 81 to raise the pump 80 to operating pressure.

When the pump control valve solenoid 41 is deenergized, load sense fluid flow from the pump is interrupted and pressure bleeds off through passages 52–54 and restrictor orifice 47 to tank, thus removing the load sense signal. The same action takes place in the raise mode when the raise valve solenoid 21 is deenergized.

Thus it will now be understood that without pump control pilot 40, the load sense signal only appears when raise pilot 20 is energized. As soon as the raise pilot is energized the pressure between second stage valve 25 and check valve 49 is bled off through check valve 48 and orifice 47 to tank. In this manner a load sense signal is obtained between second stage 25 and check valve 49 which appears and disappears in dependence on the energization of raise pilot 20. Since normally closed system 11 requires pilot 20 and second stage 25 whether or not load sense is taken, the present load sense application is provided only by lines 46, 43 and check valve 48 without a requirement of separate valving or a separate land on a spool. Thus without the additional structure of valve actuator where force is applied to position flow-directing elements, load sense is taken and coupled in.

To initiate the lower mode, lower solenoid valve 60 (similar to valve 20) is energized, causing first stage poppet (not shown) to withdraw from orifice 62, thereby permitting a flow through restrictor orifice 67, relieving load pressure to the right-hand side of second stage poppet 65a and thus permitting load pressure to move the poppet to the right. This allows fluid from the cylinder load inlet port 70 to pass through a second stage orifice 65c to tank outlet 65d and in this manner lower the header (load) 85. As second stage poppet 65a moves to the right, fluid trapped in chamber 66a of dashpot 66 is forced out through restrictor orifice 66b, thereby restricting the rate of opening of poppet 65a in order to dampen the rate of lowering of header 85. The function of dashpot 66 operating in conjunction with the contoured configuration of poppet 65a is similar to that described for the raise mode.

Specifically, lower dashpot 66 is effective to restrict and dampen the opening of lower second stage poppet 65a thereby to dampen the lowering of load 85. During this time the start lower shock may be effectively minimized as a result of the parabolic contour of poppet 65a which provides a substantially linear flow rate between the poppet and orifice 65c as described in detail in U.S. Pat. No. 3,980,002. When poppet 65a reaches its fully opened position, weight 85 continues to lower until pilot stage 60 of lower assembly 55 is deenergized. At that time poppet 65a returns to its normally closed state and poppet 65a unrestricted by dashpot or dampening assembly 66 rapidly closes to minimize undershoot of the load. It will be understood that such a minimum undershoot is desirable and with fluid flow between the parabolic contour of poppet 65a and the associated orifice there is thus some improvement in the deceleration or stop lower shock.

FIGS. 6–10 show a simplified version of a closed center dual programmed unbalanced load valve system 91 without load sensing. It embodies two two-stage valve assemblies 100 and 110 with dashpots 106 and 116. Referring to FIGS. 6–10, operation of the raise valve assembly 100 and lower valve assembly 110 is similar to that previously described for raise valve assembly 15 and lower valve assembly 55, respectively.

Figure 10:
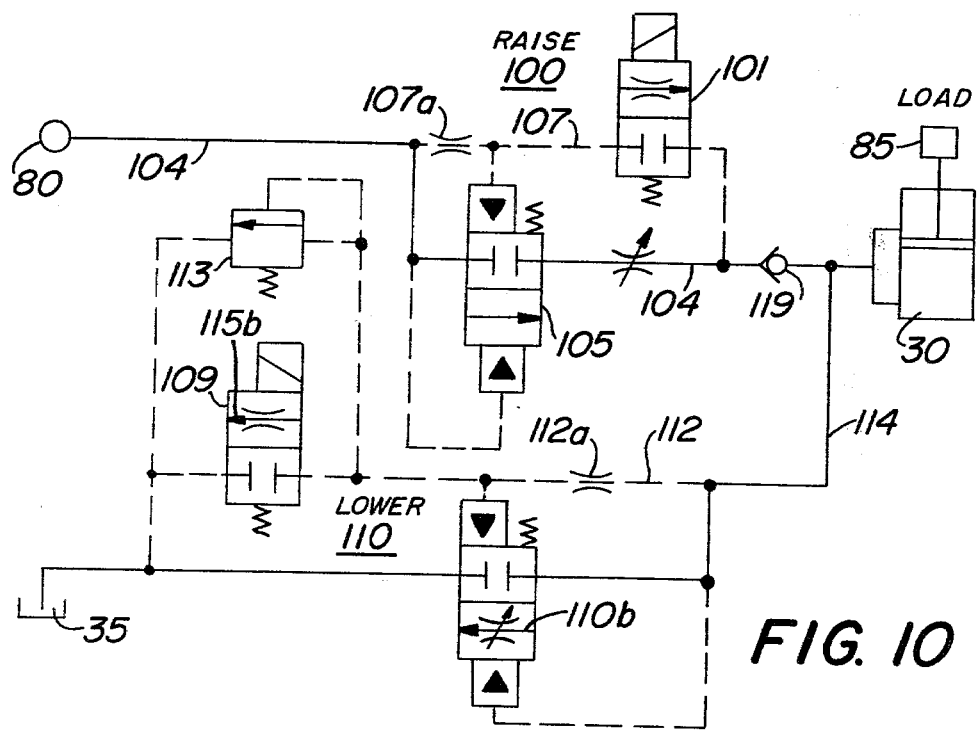
FIG. 10 is a schematic drawing of the valve system of FIG. 6 together with an unbalanced load and a pump.

As best shown in FIGS. 8–10, pump 80 is coupled (1) by way of open second stage orifice 105b, line 104, and check valve 119 to the raise side of load cylinder 30, (2) by way of pilot line 107, restrictor 107a, and open first stage raise orifice 101b, line 104, and check valve 119 to the raise side of cylinder 30. The lower side of load cylinder 30 is coupled (1) by way of line 114, and open second stage lower orifice 110b to tank 35, (2) by way of pilot line 112, restrictor 112a, and first stage lower orifice 115b to tank 35 and also (3) by way of pilot line 112 and pressure relief valve 113 to tank 35.

Accordingly, as shown, first stage raise poppet 101a, seated in orifice 101b, controls flow between pilot line 107 coupled to the pump 80 and line 104 which is in communication by way of check valve 119 with the raise side of load cylinder 30. First stage lower poppet, (not shown), seated in orifice 115b″ controls the flow between load cylinder 30, pilot line 112, restrictor orifice 112a and tank 35.

Operation is described as follows (refer to FIGS. 6–10). In the quiescent state, both raise and lower solenoid operated first stage orifices 101b and 115b are closed, and raise and lower second stage orifices 105b and 110b are therefore also closed. Pump idle pressure is applied directly to the left hand side of second stage raise poppet 105a and, through a restrictor orifice 107a, to the right hand side. Load pressure is applied directly to the right hand side of lower second stage poppet 110b and through restrictor orifice 112a to the left hand side.

To initiate the raise sequence, raise pilot valve 101 is energized, causing raise first stage poppet 101a to open first stage orifice 101b. This permits a flow of fluid across restrictor orifice 107a relieving pump pressure to the right-hand side of second stage poppet 105a, thereby permitting pump pressurized fluid, still applied to the left hand side, to move this poppet to the right. This allows fluid from the pump to flow through line 104 to check valve 119 and thence through the pressure outlet port to pressurize the raise side of load cylinder 30. The rate of opening of poppet 105a is dampened by dashpot assembly 106 which operates exactly as described for dashpot 26.

To initiate the lower mode, lower pilot valve 109 is energized, causing first stage poppet to withdraw from orifice 115b thereby permitting a flow through restrictor orifice 112a, relieving load pressure to the left-hand side of second stage poppet 110a and thus permitting load pressure to move the poppet to the left. This allows fluid from the cylinder load inlet port to pass through second stage orifice 110b to tank 35 and in this manner lower the load. Again the rate of opening of second stage poppet 110a is dampened by dashpot 116 operating exactly as described earlier for dashpot 66.

In review it will be understood that poppets 25a, 65a, 105a and 110a each have substantially parabolic contours and each having an outer, smooth, imperforate and continuous surface. The dimensions of the parabolic contours, the respective second stage orifices and the orifices of the respective pilot stages are chosen in a predetermined relation for providing the substantially linear flow rate change for a substantially constant acceleration.

What is claimed is:

1. A programmed valve system having a load sense fluid source with a load sense line for control of the positioning of load means by a pair of two stage valve assemblies comprising a first of said two stage valve assemblies comprising a solenoid operated pilot stage maintained normally closed, a second stage divided into inlet and outlet sections with said inlet section being coupled to said fluid source, a second stage orifice between the sections within which a second stage poppet reciprocates, a second of said two stage valve assemblies comprising a solenoid operated pilot stage maintained normally closed, a second stage divided into inlet and outlet sections, a second stage orifice between the sections within which a second stage poppet reciprocates, said second stage poppets each having an outer substantially parabolic contour to provide a predetermined flow area between the respective orifice and parabolic contour, and means coupling said load means to said outlet sections of said pair of valve assemblies, means free of a valve actuator for coupling said load sense line to said outlet section of said first valve assembly whereby a load sense signal is applied by way of said outlet section and said load sense line to said fluid source during the time said first assembly pilot stage is actuated to the valve open state.

2. The valve system of claim 1 in which said means free of a valve actuator includes a one way directional valve.

3. The valve system of claim 2 in which said means coupling said load means to said first assembly includes an additional one way directional valve and said means free of a valve actuator is coupled between the outlet section of said first valve assembly of said additional one way directional valve.

4. A programmed valve system for control of the raising and lowering of load means from a load sense fluid source having a load sense line and including a raise and a lower two stage valve assembly comprising said raise two stage valve assembly comprising a raise first solenoid operated pilot stage maintained normally closed during the rest state, a raise second stage divided into inlet and outlet sections, said raise inlet section being coupled to said fluid source, a raise second stage orifice between the sections within which a raise second stage poppet reciprocates, said lower two stage valve assembly comprising a lower first solenoid operated pilot stage maintained normally closed during the rest state, a lower second stage divided into inlet and outlet sections, a lower second stage orifice between the sections within which a lower second stage poppet reciprocates, said raise and lower second stage poppets each having an outer substantially parabolic contour to provide a predetermined flow area between the respective orifice and the parabolic contour, said first raise and lower pilot stages being respectively coupled to said raise and lower second stages only by fluid communication for normally maintaining the respective second stages closed and whereby said respective raise and lower second stage poppets are controlled in closing with substantially linear flow rate change with poppet within orifice for minimized shock when the respective pilot stage is actuated to the valve closed position, and means coupling said load means to said raise and lower outlet sections and directly coupling said load sense line to said raise outlet section whereby a load sense signal is applied by way of said raise outlet section and through said load sense line to said fluid source only during the time said raise pilot is solenoid actuated t the valve open state.

5. The valve system of claim 4 in which said means directly coupling said load sense line to said raise outlet passage is free of a valve actuator.

6. The valve system of claim 5 in which said directly coupling means includes a one way directional valve.

7. The valve system of claim 6 in which said means coupling said load means to said raise outlet section includes an additional one way directional valve and said directly coupling means is coupled between said raise outlet section and said additional one way directional valve.

8. The valve system of claim 7 in which there is provided a solenoid operated pump control load sense valve coupled between said pilot line and said fluid source maintained normally closed and upon solenid actuation to the valve open state for permitting fluid from the pump to be applied directly to said load sense line thereby raising the fluid source to operating pressure.

9. The valve system of claim 5 in which there is provided raise dashpot means coupled to said raise second stage poppet for dampening only the rate of opening but not of closing of said raise second stage poppet thereby to dampen the raising of said load means.

10. The valve system of claim 5 in which there is provided lower dashpot means coupled to said lower second stage poppet for dampening only the rate of opening but not of closing of said lower second stage poppet thereby to dampen the lowering of said load means.

11. The valve system of claim 6, 7, 9 or 10 in which the respective dimensions of (1) said parabolic contours of said raise and lower second stage poppets, (2) said second stage orifices and (3) inlet and outlet orifices of said raise and lower pilot stages are chosen in a predetermined relation for substantially linear flow rate change and means for permitting closing of said second stage poppets unrestricted by said raise and lower dashpot means whereby the respective second stage poppets minimize shock upon closing.

12. The valve system of claim 9 or 10 in which each of said dashpot means includes a dashpot having an inside chamber with an axially displaced orifice substantially insensitive to dirt to provide a metered flow of fluid from said inside chamber as said dashpot means moves to the valve open position.

* * * * *